Figure 1:
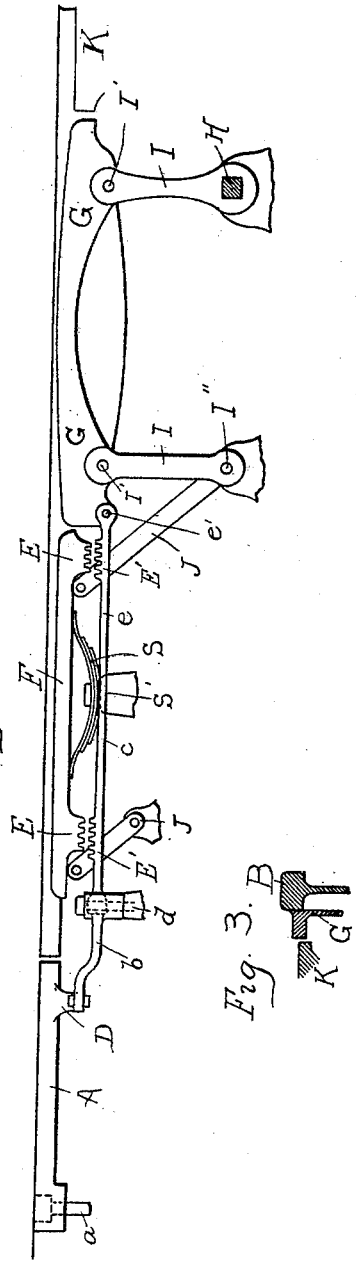

No. 660,805. Patented Oct. 30, 1900.
E. A. SPERRY.
ACTUATING DEVICE FOR RAILWAY APPLIANCES.
(Application filed May 17, 1897.)
(No Model.) 2 Sheets—Sheet 1.

WITNESSES
Wm E. Kritch
Chas F. Wright

INVENTOR.
Elmer A. Sperry

THE NORRIS PETERS CO., PHOTO-LITHO., WASHINGTON, D. C.

No. 660,805. Patented Oct. 30, 1900.
E. A. SPERRY.
ACTUATING DEVICE FOR RAILWAY APPLIANCES.
(Application filed May 17, 1897.)
(No Model.) 2 Sheets—Sheet 2.
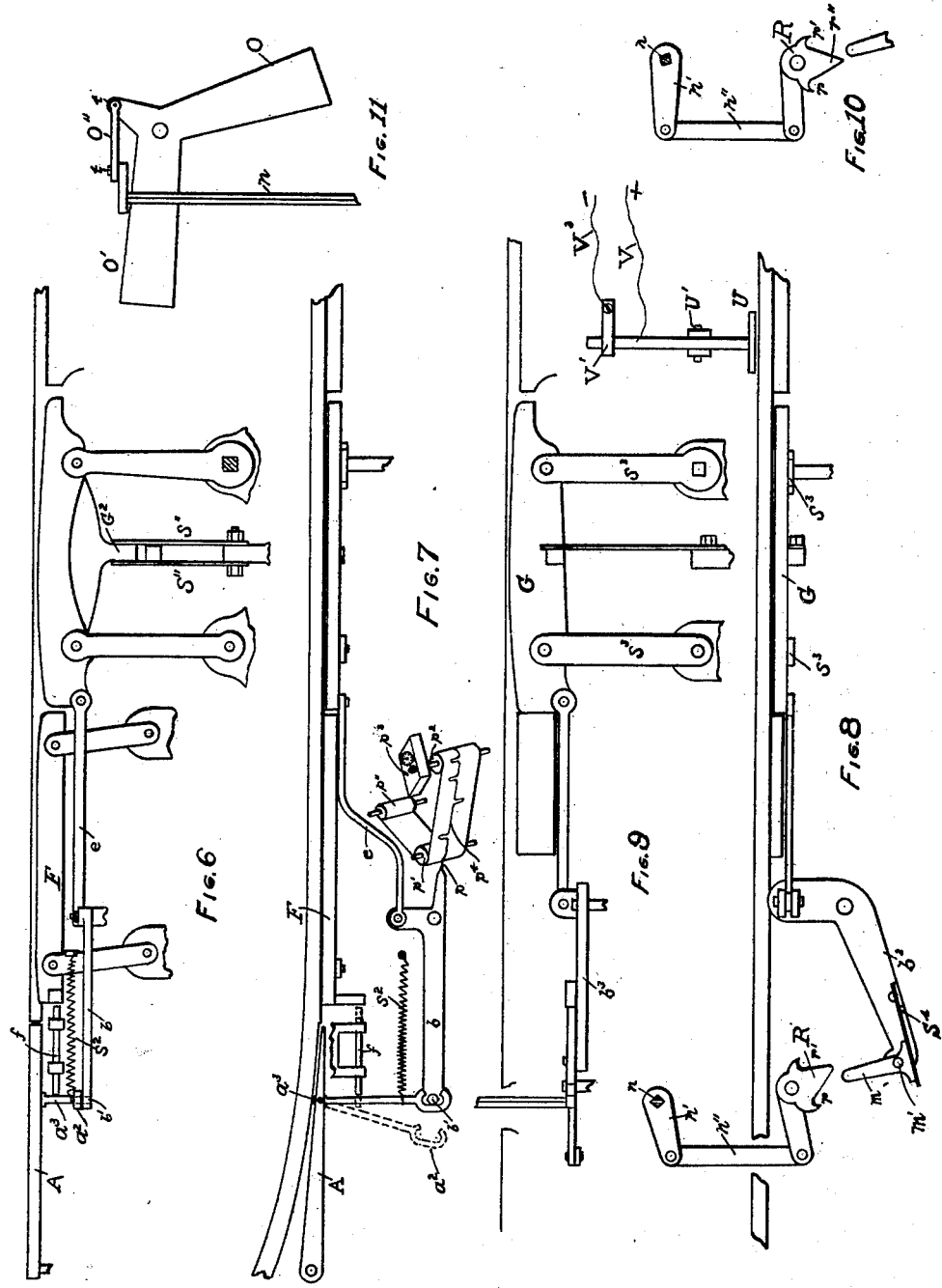
WITNESSES
W.K. Monroe
Chas F Wright
INVENTOR
Elmer A Sperry

UNITED STATES PATENT OFFICE.

ELMER A. SPERRY, OF CLEVELAND, OHIO.

ACTUATING DEVICE FOR RAILWAY APPLIANCES.

SPECIFICATION forming part of Letters Patent No. 660,805, dated October 30, 1900.

Application filed May 17, 1897. Serial No. 636,924. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Actuating Devices for Railway Appliances; and I do hereby declare that the following specification, taken in connection with the drawings furnished and forming a part of the same, is a clear, true, and complete description of my invention.

My said improvements relate to mechanism for controlling and operating railway appliances—such as switches, signals, gates, &c.—and has reference more especially to such mechanism as may be controlled by an engineer or motorman of a moving locomotive or car.

My invention consists in the employment of what I will term a "movable part," which may be a portion of a railway-track or independent thereof, but lying in the path of a wheel or wheels of a locomotive or car, the said part being suitably connected to the appliance to be operated and adapted to be moved by a passing wheel for operating the appliance in either of two directions or left quiescent, according as to whether power is being applied for accelerating the movement of the wheel or it is being retarded by the action of a brake or it be acting as a mere idler or roller. These three conditions of a wheel I have termed its "torque" condition, one or the other of the first two conditions mentioned being necessary for operating an appliance and the last-mentioned condition being required when the appliance is to remain quiescent.

In some forms of my device the movable part is arranged to be moved in two directions for effecting opposite movements of the actuated appliance, in which case it is necessary that power be applied to the drive-wheel of the locomotive or car for moving the appliance in one direction and that the wheels be retarded by a brake for effecting an opposite movement.

In another form of my device in which successive movements in a single direction of the movable part will produce opposite movements in the actuated appliance only one of the above-mentioned torque conditions will be required for operating the appliance in either direction, which one depending on the connecting mechanism.

I am aware that switch-points have been controlled in one of their movements by the torque condition of a passing wheel; but in each instance known to me a "trip" has been relied upon for effecting a return movement of the switch-point. It will be readily seen that such mechanism is wholly unfit for use with signaling appliances, for the reason that a train which has to pass over the trip could not leave a signal in the position in which it has been placed and a train which is not to pass over the trip cannot operate a signal controlled thereby.

With the device embodying my invention a signal, switch, or other appliance may be operated in either direction from a single point, and I am the first, so far as I am aware, to so organize a railway actuating device that a single movable part will effect a movement of an appliance in either of two directions according to the torque condition of a passing wheel.

Another feature of my invention relates to locking mechanism for preventing displacement of an appliance by the wheels of a car or locomotive which pass over the device after it has been moved in the desired direction.

Other features deemed novel will be duly specified in the several clauses of the claim hereunto annexed.

To more particularly describe my invention, I will refer to the accompanying drawings, in which—

Figure 3:
Figure 5:
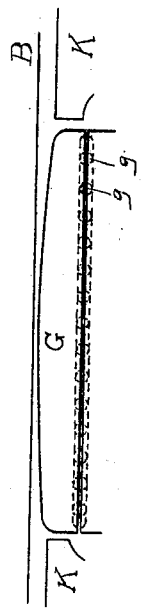
Figure 4:
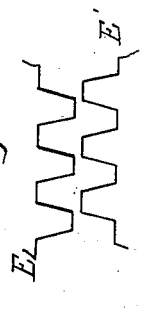
Figure 2:
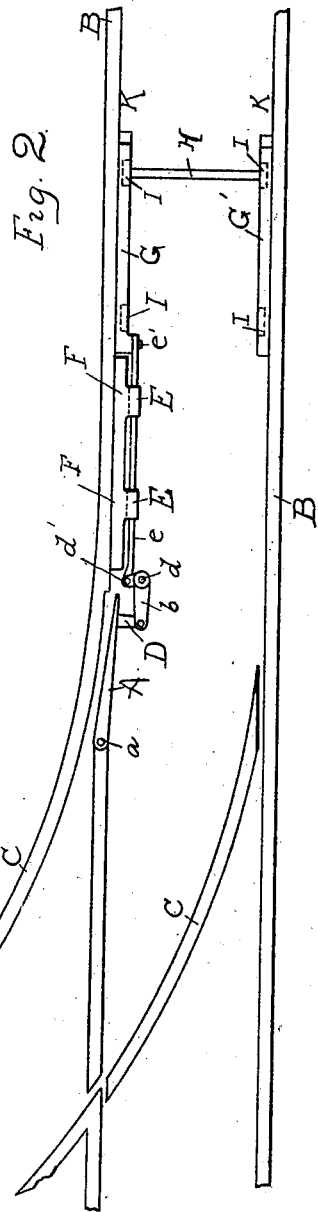

Figures 1 and 2, in side and top views, illustrate one form of my actuating device as employed for operating a switch-point, the movable part here shown having a movement in two directions for effecting opposite movements of the switch-point. Fig. 3 is a detail sectional view through the movable part and a portion of the railway-track. Fig. 4 is a detail view of a portion of the locking mechanism of Fig. 1. Fig. 5 illustrates another mode of mounting the movable part sometimes employed by me. Figs. 6 and 7, in side and top views, illustrate another form of actuating device embodying my invention. Figs. 8 and 9, in top and side views, illustrate still another form of my actuating device shown in connection with a signaling appliance, the movable part of this device being moved successively in the same direction for effecting different movements of the signaling appliance. Fig. 10 is a detail view of a portion of the connecting mechanism between the movable part and the signaling appliance of Figs. 8 and 9. Fig. 11 illustrates the appliance actuated by the device of Figs. 8 and 9.

Referring to Figs. 1 and 2, the movable part here shown is designed to be controlled by the flange of a passing wheel instead of by the tread, and is consequently located closely adjacent to the inner side of a railway-track B; but it is to be distinctly understood that it is immaterial to the main portion of my invention whether said movable part be a portion of the track itself or be separated therefrom or in what manner it may be mounted, so long as its movements may be controlled by the torque condition of a passing wheel. As here shown, the movable part G is supported upon links I I, to which it is pivoted, as at I' I', the lower ends of the links being pivoted to suitable supports located beneath the movable part, as clearly shown. As thus mounted the movable part G may be moved backward or forward, and where it is desirable to limit said movements a guard K (shown in Figs. 1, 3, and 5) may be relied upon for this purpose.

At the forward end of the movable part G is pivoted, as at $e'$, a rod $e$, the other end of said rod being pivoted, as at $d'$, to one arm of a bell-crank lever $b$, fulcrumed at $d$. The other arm of the bell-crank lever $b$ is secured to the device to be actuated, which in this instance is a switch-point A, pivoted at $a$ and secured to the bell-crank lever by the lug or projection D, the said switch-point opening and closing a side track C.

As thus far described it will be seen that a forward movement of the movable part G will operate to throw the switch-point in its open position, while a rearward movement will operate to close the same.

The movable part G is placed a little below the tread-surface of the track in order to relieve it from unnecessary weight, and in order to prevent a forward movement by sudden contact with a wheel its ends are inclined a little below the flange-line of the wheel. It will now be understood that if power is being applied to the drive-wheels of a car or locomotive approaching the switch-point A the contact of the flange of said wheels with the movable part G will be gradual, because of its inclined ends, and a kind of treadmill action will take place between the wheels and movable part, and the latter will be moved in a rearward direction and the switch-point A moved to its closed position. If the motion of the approaching wheels should be retarded by the application of a brake, the movable part G will be moved in a forward direction and the switch-point moved to its open position. When the wheels are free from both power and brakes, or acting as mere idlers, no motion will be imparted to the movable part, and the switch-point will remain quiescent.

Where opposite wheels of a locomotive or car are coupled solidly to the same axle, it is desirable that the movable part G be duplicated at the opposite rail of the track, as illustrated in Fig. 2, the movable part G' being coupled to the movable part G by a rod H, as clearly shown.

In Fig. 5 I show a movable part G, mounted upon rollers or balls $g$, this form being specially desirable where great weight is to be borne by the movable part, as—for instance, where it forms a part of the track or is to be operated by the tread of a wheel instead of the flange.

For preventing any displacement of the actuated appliance by wheels which have to pass over the movable part after it has been moved in the desired direction I provide certain locking mechanism, one form of which is illustrated in connection with the device of Figs. 1 and 2. Directly in front of the movable part G is a depressible block or bar F, which lies in the path of the flange of a passing wheel and directly over the connecting-rod $e$, between the bell-crank lever $b$ and the movable part G. This block or bar F is pivoted at each end to links J for maintaining it in a horizontal position, and is supported upon a spring S, secured to a suitable support S'. On the under side of said block or bar are two sets of teeth E E, which when the block or bar is depressed engage with similar teeth E' E', formed upon the upper side of the rod $e$. As soon as a wheel leaves the movable part G it will immediately operate to depress the block or bar F and cause the teeth E E to engage with the teeth E' E' on the rod $e$, and thus confine the switch-point to the position to which it was moved by the movable part G.

It is to be understood that the block or bar F is of sufficient length to receive the rear wheels of a car before it is released by the forward wheels thereof, so that the actuated appliance may be securely held at all times during the passage of a train; but the same results may be accomplished if two shorter blocks be located at a proper distance from each other.

In the device illustrated in Figs. 6 and 7 the movable part G is as before described, except that it is provided at its under side with a lug or projection $G^2$, which is engaged by springs S'' S'', coöperating with a stop $S^4$ for maintaining it in a central position. The connecting mechanism between the movable part and the switch-point A consists of a rod $e$ and bell-crank lever $b$; but instead of the latter taking direct hold of the switch-point it is provided with a pin $b'$, which engages with an elongated open slot $a^2$ upon the end of an arm pivoted at $a^3$ to the switch-point A. This arm is held in engaging contact with the pin $b'$ of the bell-crank lever $b$ by a spring $S^2$. The depressible block F is supported upon links, as in Figs. 1 and 2; but at its forward end it is provided with a lug or projection which engages with a sliding pin $f$, which in turn engages with the pivoted arm on the switch-point for throwing it out of engagement with the bell-crank lever $b$, as indicated in dotted lines in Fig. 6. As thus organized a forward or backward movement of the movable part G will operate to move the switch-point to its open or closed position, and a passing wheel which has caused either of these movements will operate to depress the block F, and the latter being supported upon links which are slightly inclined forward will cause the pin $f$ to push the pivoted arm of the switch-point A out of engagement with the bell-crank lever $b$, and thus free the switch-point from any further movements that may be imparted to the movable part G. After the block F has been released by the passing wheels the spring $S^2$ will immediately act to throw the several parts into operative position.

In Figs. 8 and 9 I have illustrated another form of device embodying the main feature of my invention, in which the connecting mechanism between the movable part and the appliance to be actuated is such that successive movements of the movable part in a single direction will effect opposite movements of the appliance. I have illustrated this device in connection with a semaphore having arms O and O'. (Illustrated in Fig. 11.) The movable part G of this device is mounted upon links $S^3 S^3$ and is connected by a rod with a bell-crank lever $b^2$, as in the figures before described; but in this instance it is restricted to a rearward movement only, being held by a spring in its extreme forward position, as clearly shown. The long arm of the bell-crank lever $b^2$ is provided with a pawl or finger $m$, pivoted at $m'$ and held in a central position by a spring $S^4$. This pawl $m$ engages with a ratchet R, having teeth $r$ $r'$ at each side of a projection $r''$, which guides the pawl $m$ to one tooth or the other, according to the position in which it was left by the preceding engagement. The ratchet R may be directly coupled to the rod $n$, which operates the semaphore, or it may form the short arm of a bell-crank lever, as shown, the long arm of said lever being connected by a link $n''$ and crank $n'$ to the rod $n$. In the position shown if the movable part G be moved in a rearward direction the pawl $m$ of the bell-crank lever $b^2$ will engage with the tooth $r$ of the ratchet R and through the several connections rotate the rod $n$. This rod $n$, being connected by crank and link $O''$, pivoted at $t$ and $t'$ to the semaphore, will cause the latter to assume the position illustrated in Fig. 11. The movable part G upon being released will return to its normal position through the action of its spring, before described, and the ratchet R will be left in the position shown in Fig. 10 ready to be engaged at its opposite tooth $r'$ by the pawl $n$ for changing the position of the semaphore at the next movement of the movable part G.

While I have illustrated my invention in connection with a switch-point and a semaphore, it is to be understood that it may be usefully employed in connection with other appliances. It may also be used to transmit signals to an engineer or motorman. This may be done by employing a locking device operated from a distance, whereby the engineer or motorman would know from the non-action of the device that a certain predetermined signal was meant to be conveyed, and when thus used it may be necessary for the party signaling to know of the passage of the train. Any well-known means may be employed for this purpose; but I have illustrated in Fig. 8 a trip U, which is to be engaged by the wheels of a passing train for depressing one end of a lever U', which completes an electric circuit through the wires V and $V^2$ and contact V' in a manner well known.

It may sometimes be desirable to record the number and direction of the movements of an actuated appliance, and I have illustrated in Fig. 7 a device suitable for this purpose. At any convenient point upon the bell-crank lever $b$ is secured a pencil or point $p$, arranged in marking contact with a strip of paper $p'$, which is unwound from a roller $p''$ and upon a roller $p^2$ by clockwork $p^3$. The paper being in motion, a movement of the bell-crank lever in either direction will be recorded, as shown by the line $p^4$. The clock-movement $p^3$ may be arranged to move the paper a short distance and then stop and may be set in motion at the proper time by the trip U of Fig. 8, as will be readily understood.

Having thus described my invention, what I claim as new, and desire to secure by Letters Patent, is—

1. In an actuating device for railway appliances, a movable part lying in the path of a wheel or wheels of a locomotive or vehicle and suitable connections between said movable part and the appliance to be actuated, whereby the said appliance may be actuated in either of two directions or left quiescent by the torque condition of said wheel or wheels, substantially as described.

2. In an actuating device for railway appliances, a movable part lying in the path of a wheel or wheels of a locomotive or vehicle and adapted to be moved in two directions for effecting different movements of the actuated appliance, the said movable part being controlled in its movements by the torque condition of a passing wheel or wheels, substantially as described.

3. In an actuating device for railway appliances, a movable part lying closely adjacent to a railway-track, but below the tread-surface thereof, and suitable connections between said movable part and the appliance to be actuated, whereby the latter may be actuated in either of two directions by the flange of a passing wheel or wheels or left quiescent, by the torque condition of the wheel or wheels, substantially as described.

4. In a device for operating railway appliances, a movable part lying in the path of a wheel or wheels of a locomotive or vehicle and adapted to be moved thereby, the said movable part being suitably connected to the appliance to be operated and having its upper or contact surface inclined at its ends, substantially as and for the purposes specified.

5. In an actuating device for railway appliances, a movable part lying in the path of a wheel or wheels of a locomotive or vehicle and adapted to be moved by the torque condition thereof, suitable connections between the movable part and the appliance to be actuated, and locking mechanism for securing the appliance in the position to which it has been moved, during the passage of a train, substantially as described.

6. In an actuating device for railway appliances, a part lying in the path of a wheeled locomotive or vehicle and adapted to be moved by the torque condition of one or more of the passing wheels, and a locking device also in such path, whereby, at a predetermined point in the travel of the wheel or wheels, the part or parts are rendered inactive.

7. In an actuating device for railway appliances, a part lying in the path of a wheeled locomotive or vehicle, and adapted to be moved by the torque condition of one or more of the passing wheels, and a locking device impinged by the passing wheel or wheels and adapted to render the part or parts inactive during such impingement.

8. In an actuating device for railway appliances, a part lying in the path of a wheeled vehicle and adapted to be moved in either direction from a central position by the torque condition of a passing wheel of the vehicle, and a centralizing device for returning the part to a central position, consisting of opposing springs and a fixed stop or stops for limiting the movement of said springs, substantially as shown and described.

9. In an actuating device for railway appliances, such as switches, the combination of one or more movable parts located in the path of, and adapted to be actuated by the movement of the car-wheels, said movable part or parts being provided with permanent connections with the appliance to be actuated and adapted thereby to communicate motion to the latter in either of two directions, whereby the position of the appliance is determined by the adjustment of the movable part or parts, substantially for the purpose set forth.

10. In an actuating device for railway appliances, such as switches, the combination with track-rails, of one or more movable parts, slidably located in the path of the car-wheels on each side of the track, a rock-shaft extending transversely of the track beneath the rails with upwardly-projecting arms connected to the movable parts, and permanent connections between the movable parts and the appliance to be actuated, whereby the position of the actuated appliance is determined by the position of the movable parts, substantially for the purpose set forth.

11. In an actuating device for railway appliances, a part lying in the path of a wheel or wheels of a locomotive or vehicle and adapted to be moved thereby, and recording mechanism arranged to record the movements of said device, substantially as described.

ELMER A. SPERRY.

Witnesses:
FRANKLIN SCHNEIDER,
Z. A. SPERRY.